United States Patent
Gomes

(10) Patent No.: US 9,934,125 B1
(45) Date of Patent: Apr. 3, 2018

(54) GENERATION AND DISPLAY OF IN-LINE TRACE DATA AFTER ERROR DETECTION

(71) Applicant: International Business Machines Corporation, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 15/282,170

(22) Filed: Sep. 30, 2016

(51) Int. Cl.
*G06F 9/44* (2006.01)
*G06F 11/36* (2006.01)

(52) U.S. Cl.
CPC ...... *G06F 11/3636* (2013.01); *G06F 11/3664* (2013.01)

(58) Field of Classification Search
CPC .................................................. G06F 11/3636
See application file for complete search history.

(56) References Cited

U.S. PATENT DOCUMENTS

| | | |
|---|---|---|
| 8,578,340 B1 | 11/2013 | Daudel et al. |
| 2008/0052680 A1* | 2/2008 | Thebes ................. G06F 11/366 717/124 |
| 2008/0134148 A1* | 6/2008 | Clark .................. G06F 11/3636 717/128 |
| 2009/0049428 A1 | 2/2009 | Cozmei |
| 2010/0146489 A1 | 6/2010 | Ortiz |
| 2013/0073526 A1* | 3/2013 | DeLuca ............. G06F 17/3015 707/692 |
| 2014/0068568 A1 | 3/2014 | Wisnovsky |

* cited by examiner

*Primary Examiner* — Hang Pan
(74) *Attorney, Agent, or Firm* — Cantor Colburn LLP; Steven Chiu

(57) ABSTRACT

Techniques are described for providing error and trace data regarding execution of a computer program. A trace control parameter is disabled, and program execution of a computer program is initiated. The state of program execution at a first time is saved during the traced program execution and, subsequent to the first time and prior to an occurrence of a first error during the traced program execution, execution of one or more trace message instructions is suppressed based on the disabled trace control parameter. In response to identifying that an error has occurred, the trace control parameter is enabled, the saved state of program execution is restored, and the traced program execution is continued such that the trace message instructions are executed based on determining that the trace control parameter is enabled.

14 Claims, 3 Drawing Sheets

GENERATION AND DISPLAY OF IN-LINE TRACE DATA AFTER ERROR DETECTION

BACKGROUND

This disclosure relates to generation and printing of trace data during execution of computer software code.

In the existing arts, a test program generally provides control inputs for controlling trace data in order to aid program debugging. If the test program makes a trace control parameter active, then the program generates and prints trace data into a spool file as the test program runs. This typically causes a large amount of trace data to be printed to the spool file if the program does not detect an error, and the spool device may therefore be filled prior to the program detects an error. In certain scenarios, the spool file becomes unable to receive additional trace data by the point in execution at which an error is actually detected. At best, it may be difficult to manage the huge spool file with error output.

Accordingly, it is an object of the present invention to provide techniques for reducing the amount of data printed to a spool file while enabling the capturing of trace data for purposes of debugging computer program code.

SUMMARY

According to at least one embodiment, a method is provided for providing error and trace data regarding execution of a computer program. The method is implemented by one or more computing systems and comprises initiating traced program execution of a computer program, wherein initiating the traced program execution includes disabling a trace control parameter. The method further comprises saving a state of program execution at a first time during the traced program execution and, subsequent to the first time and prior to an occurrence of a first error during the traced program execution, suppressing execution of one or more trace message instructions based at least in part on a determination that the trace control parameter is disabled. The method also includes, in response to identifying that the first error has occurred: enabling the trace control parameter, restoring the state of program execution saved at the first time, and continuing the traced program execution. Continuing the traced program execution includes executing the one or more trace message instructions based at least in part on a determination that the trace control parameter is enabled.

According to another embodiment, a computer-readable storage medium has stored contents that, when executed, cause a computing system to perform a method for providing error and trace data regarding execution of a computer program. The method comprises initiating traced program execution of a computer program, wherein initiating the traced program execution includes disabling a trace control parameter. The method further comprises saving a state of program execution at a first time during the traced program execution and, subsequent to the first time and prior to an occurrence of a first error during the traced program execution, suppressing execution of one or more trace message instructions based at least in part on a determination that the trace control parameter is disabled. The method also includes, in response to identifying that the first error has occurred: enabling the trace control parameter, restoring the state of program execution saved at the first time, and continuing the traced program execution. Continuing the traced program execution includes executing the one or more trace message instructions based at least in part on a determination that the trace control parameter is enabled.

According to another embodiment, a system comprises one or more processors and at least one memory including instructions that, upon execution by a processor, cause the system to perform a method for providing error and trace data regarding execution of a computer program. The method comprises initiating traced program execution of a computer program, wherein initiating the traced program execution includes disabling a trace control parameter. The method further comprises saving a state of program execution at a first time during the traced program execution and, subsequent to the first time and prior to an occurrence of a first error during the traced program execution, suppressing execution of one or more trace message instructions based at least in part on a determination that the trace control parameter is disabled. The method also includes, in response to identifying that the first error has occurred: enabling the trace control parameter, restoring the state of program execution saved at the first time, and continuing the traced program execution. Continuing the traced program execution includes executing the one or more trace message instructions based at least in part on a determination that the trace control parameter is enabled.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Figure 1:
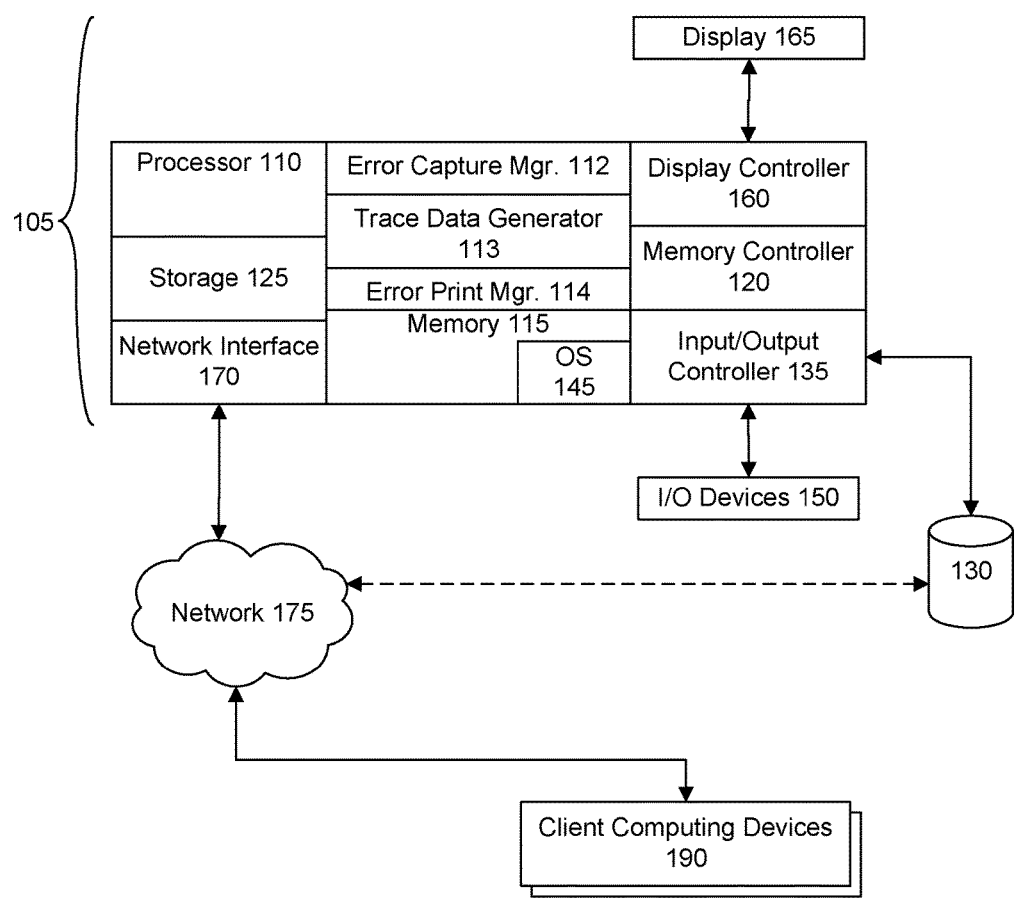
FIG. 1 depicts a block diagram of an exemplary network environment and computing system in accordance with an embodiment of techniques described herein.

One or more embodiments described herein enable one or more processor-based computing systems to automatically generate in-line trace data only after an error is detected, suppressing the generation of such trace data prior to error detection. The printing of trace data is suppressed before an error is detected is by providing additional controls to not generate, store or print trace data before an error is detected. The error path code is re-executed using a saved program state, and the needed trace data is printed after the error has been detected. In this manner, the described techniques prevent the logging of unwanted traced data.

Generally, a testing or application program provides input parameters to control various kinds of trace data to aid program debugging. If a trace control parameter is active, then the program generates and prints trace data into a spool file as the test program executes (i.e., time-based in-line printing). If the program does not detect an error, the user winds up with a large spool file containing useless trace data. Trace output can accumulate quickly, resulting in either (a) a spool device with maxed capacity before any error is detected or (b) generation of a huge spool file that does contain relevant error output, but that is very difficult to manage. Another problem arises when multiple instances of a program are executing with active trace control parameters, and one or more particular instances of that program result in printed error output. In such scenario, the output may be very difficult to understand because output from those instances of the program that did not detect an error (i.e., unwanted trace data) is interleaved with trace data and error output from instances of the program that did detect such an error (i.e., those with useful trace data).

As one example, a cryptographic algorithm such as the Secure Hash Algorithm-3 (SHA-3) algorithm may produce a very large amount of trace output. If there is a problem with the implementation of the SHA-3 algorithm, then printing the trace output of that SHA-3 algorithm immediately after printing the related information of the instruction that initiated the SHA-3 algorithm would assist in easily identifying the SHA-3 algorithm trace data for the failing instruction, since the output data for the two items are adjacent to each other.

One or more embodiments of techniques described herein implement the enabling and disabling of trace data capture via the use of a trace control. In at least some embodiments, the trace control is initially disabled until an error is detected by the program during its execution. When an error is detected by the program, the trace control is enabled and the current program state is set to save as a program state associated with a controlled trace point. In such embodiments, program execution then returns to the set trace point, such that the section of program code which led to the error is re-executed. During re-execution, the trace control is enabled and the trace messages corresponding to the re-executed section of program code are generated and printed. When an error is detected again during re-execution of the code section, the trace control is disabled again and the traced data is printed.

In this manner, trace data and error output data are intermixed, effectively producing results as if the relevant trace data were being generated in-line during the normal execution of the code. Thus, unwanted trace data generation is prevented by generating such trace data only after an error is detected.

It will be appreciated that as used herein, the term "print" and "printing" of trace messages and error messages refers to any display, output, or spooling of such messages unless the context clearly indicates otherwise.

FIG. 1 illustrates a block diagram of a networked computing system 100 for use in practicing the teachings herein. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a processor 110, an error capture manager module 112, a trace data generator 113, an error print manager module 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. In the depicted embodiment, one or more client computing devices 190 are communicatively coupled to the network 175, such as client computing devices associated with users who provide program execution information and/or one or more trace data capture configuration parameters to computer 105 in order to receive selective trace data and error output from the computing system.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2:
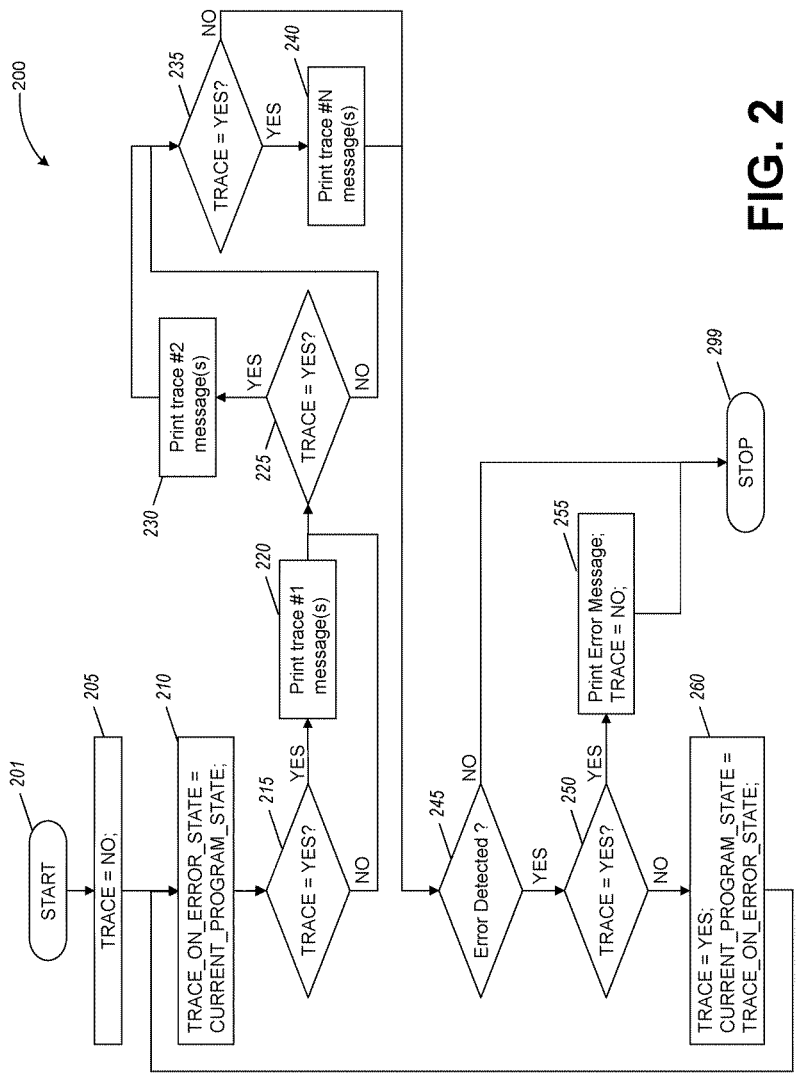
FIGS. 2-3 depict process flows for providing error and trace data regarding execution of a computer program in accordance with respective embodiments of techniques described herein.

FIG. 2 depicts a process flow 200 for providing error and trace data regarding execution of a computer program in accordance with embodiments of techniques described herein. In particular, FIG. 2 depicts generating in-line trace data only after an error is detected, and suppressing generation of such trace data before an error is detected.

Program execution begins at block 201. Before the program execution comes to a controlled trace point, the trace control parameter is disabled (block 205). When the program code execution comes to a controlled trace point at block 210, the current program state is saved. In the depicted embodiment, the current program state is saved by storing the "CURRENT PROGRAM STATE" variable array to the "TRACE_ON_ERROR_STATE" variable array; it will be appreciated that the current program state may be saved in any appropriate manner.

At block 215, the routine determines whether to execute a trace message instruction within the program execution code. If the trace control parameter is enabled, the routine proceeds to block 220 and prints message Trace #1. If the trace control parameter is disabled, the routine ignores the trace message instruction encountered of block 220 and continues program code execution until encountering the next trace message instruction at block 225. Once again, if the trace control parameter is enabled, the routine proceeds to block 230 and prints message Trace #2; if the trace control parameter is disabled, the routine skips block 230 and continues program code execution.

Program execution continues in this manner through any number N of trace message instructions. At block 235, the routine again determines whether to execute a trace message instruction within the program code and, responsive to such determination, either prints message Trace #N or skips such printing to proceed with program execution.

In this manner, prior to the routine detecting an error, all trace message instructions are suppressed (i.e., not executed) because they are under trace control parameter and the trace control parameter is disabled until an error is detected by the program. If no error is ever detected, no trace message is printed, and error tracing stops in accordance with the end of regular program execution (such as depicted in block 299).

To continue the depicted example of FIG. 2, assume that in block 245, an error is detected by the program for the first time. In block 250, the routine determines whether trace control parameter is enabled. If trace control parameter is already enabled, the routine proceeds to block 255, in which it prints the error message and disables the trace control parameter (such as to continue program execution without printing additional trace messages until a next error occurs, or if no error is encountered then until program execution ends). It will be appreciated, however, that during the first execution—i.e., the first time the error is detected—the trace control parameter is disabled.

If, after detecting the error in block 245 and determining in block 250 that the trace control parameter is disabled, the routine proceeds to block 260, in which the trace control parameter is enabled and the current program state is restored to that which was earlier saved at the controlled trace point of block 210. In the depicted embodiment, for example, the "CURRENT PROGRAM STATE" variable array is set to the "TRACE_ON_ERROR_STATE" variable array; again, it will be appreciated that any appropriate manner may be used to restore the program state to that which was earlier saved. The routine then returns to the controlled trace point of block 210 and starts the re-execution of the code section that led to the error. Note that during such re-execution, the trace message instructions of blocks 220, 230 and 240 are executed, resulting in the printing of the corresponding trace messages. In this manner, the trace messages are generated and printed because trace control is now enabled during the re-execution of the relevant code portion.

Continuing the depicted example of FIG. 2, when an error is detected again (e.g., for the second time) by the program during the re-execution of the code, the trace control parameter is disabled (via blocks 250 and 255) and the error message for the detected error is printed (via block 255). Thus, by generating and printing the trace messages during the re-execution of the code after an error is detected allows the trace data and error output data to be intermixed and provides results as if the trace data was produced in-line during the first execution of the code. Furthermore, in this manner, first-time trace data capture is provided without the need to re-execute the entire program in order to recreate the error with additional traces activated. This may significantly reduce error reproduction time.

Figure 3:
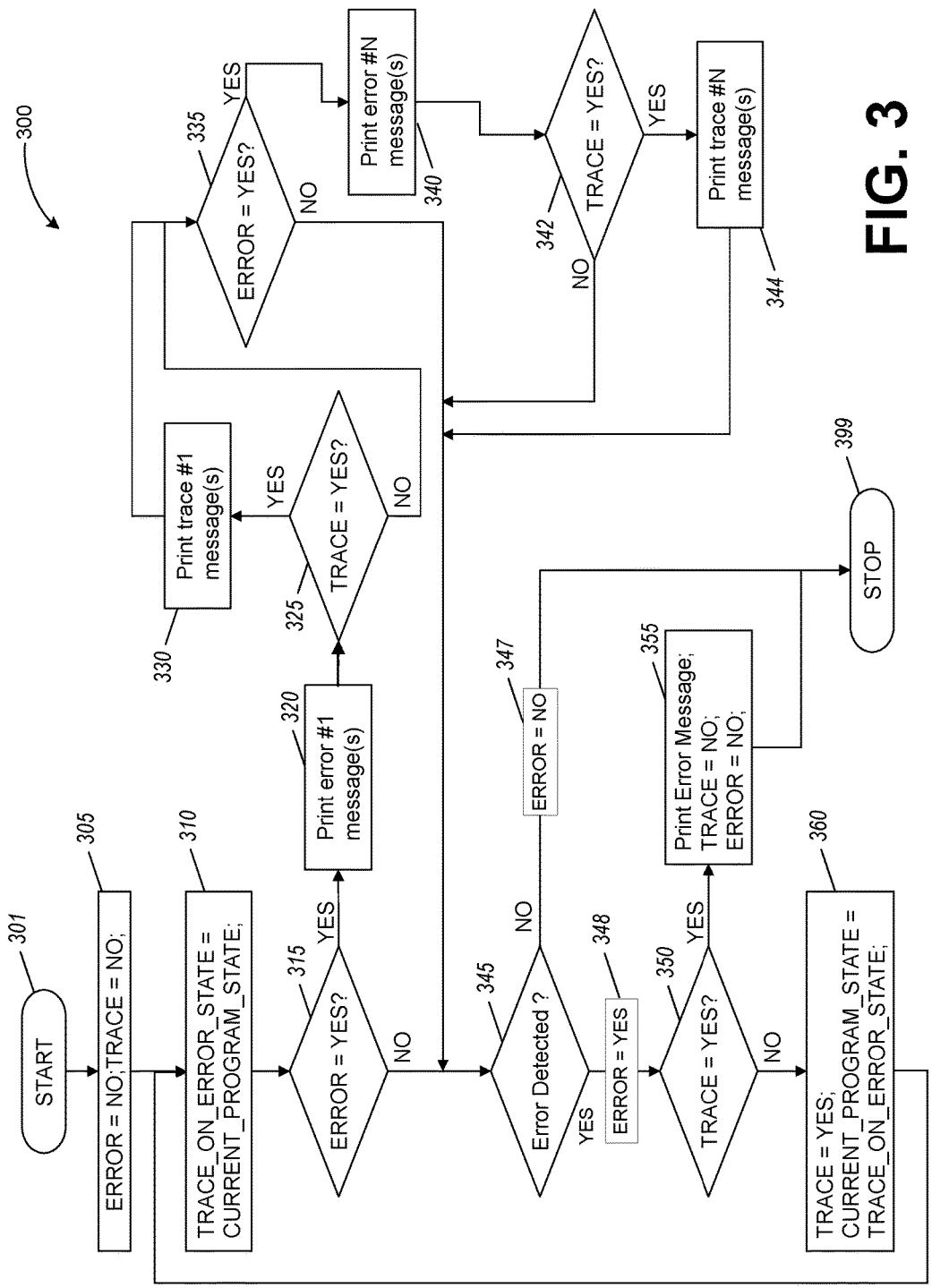

FIG. 3 depicts an alternative process flow 300 for providing error and trace data regarding execution of a computer program in accordance with embodiments of techniques described herein. In particular, FIG. 3 illustrates the generation of in-line interleaved error and trace data only after an error is detected, and the suppression of trace data generation before an error is detected. In this modified example, a number N of intermixed error data/trace data pairs may be generated and printed in-line during code re-execution, where N may be any positive integer.

Program execution begins at block 301. Before the program execution comes to a controlled trace point, an error control parameter and the trace control parameter are each disabled (block 305). When the program code execution comes to a controlled trace point at block 310, the current program state is saved. As described above with respect to FIG. 2, the current program state is saved by storing the "CURRENT PROGRAM STATE" variable array to the "TRACE_ON_ERROR_STATE" variable array, but the current program state may be saved in any appropriate manner.

At block 315, the routine determines whether the error control parameter is enabled. Assuming for now that the error control parameter is enabled, the routine proceeds to block 320 to print Error #1 message(s) and, at block 325, determines whether the trace control parameter is enabled. In a manner similar to that described with respect to FIG. 2, if the trace control parameter is disabled, the routine suppresses (i.e., does not execute) the trace message instructions encountered in blocks 330 and 344 based on determinations respectively made in blocks 325 and 342, and continues program code execution without printing the corresponding trace messages. Similarly, if the error control parameter is disabled, the routine suppresses the error messages of blocks 320 and 340 based on respective determinations made in blocks 315 and 335. Note that just as printing of the trace message(s) is controlled by the trace control parameter, printing of the error message(s) is similarly controlled by the error control parameter. Furthermore, in at least the depicted embodiment, the trace control parameter may not be enabled when the error control parameter is disabled. Program execution continues in this manner through any number N of error messages and trace message instructions.

To continue the depicted example of FIG. 3, assume that in block 345, an error is detected by the program for the first time. As similarly noted above with respect to FIG. 2, it will be appreciated that during the initial execution of the routine, the trace control parameter is not enabled, and therefore the routine does not proceed to block 355 during the initial execution. Moreover, if an error is not detected at all by the program or the error is not detected by the program during re-execution of the code section due to programming error, the error control parameter is disabled in block 347. (As one example of such a scenario, the programming error may be due to not looping back to the correct re-execution code point, or incorrect or incomplete saved state information at the controlled trace point of block 310.)

After first detecting the error in block 345, the error control parameter is enabled in block 348 prior to advancing to block 350. In block 350, the routine determines whether the trace control parameter is enabled. If the trace control parameter is already enabled, the routine proceeds to block 355, in which it prints the error message and disables both the error control parameter and the trace control parameter (such as to continue program execution without printing additional error/trace messages until a next error occurs, or if no error is encountered then until program execution ends).

If, after detecting the error in block 345 and determining in block 350 that trace control is disabled, the routine proceeds to block 360, in which the error control parameter and trace control parameter are enabled and the current program state is restored to that which was earlier saved at the controlled trace point of block 310. The routine then returns to the controlled trace point of block 310 and starts the re-execution of the code section that led to the error. Note that during such re-execution, the error messages of blocks 320 and 340, as well as the trace messages of blocks 330 and 344 are executed, resulting in the printing of the corresponding error and trace messages. In this manner, error and trace messages are printed in an interleaved manner. As analogously described with respect to FIG. 2, if no error is ever detected, no error message or trace message is printed, and error tracing stops in accordance with the end of regular program execution (such as depicted in block 399).

Although such a scenario is not explicitly depicted in FIG. 3, trace data may precede the first error data section as well. Thus, any combination of error and trace data may be generated and printed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing error and trace data regarding execution of a computer program comprising:

initiating, by one or more computing systems configured to trace execution of computer program code, traced program execution of a computer program, wherein initiating the traced program execution includes disabling a trace control parameter;

saving, by the one or more computing systems, a state of program execution at a first time during the traced program execution;

subsequent to the first time and prior to an occurrence of a first error during the traced program execution, suppressing execution, by the one or more computing systems, of one or more trace message instructions based at least in part on a determination that the trace control parameter is disabled; and in response to identifying that the first error has occurred:
      enabling the trace control parameter;
      restoring the state of program execution saved at the first time;
      continuing the traced program execution, wherein continuing the traced program execution includes executing the one or more trace message instructions based at least in part on a determination that the trace control parameter is enabled; and
      after continuing the traced program execution, disabling the trace control parameter in response to detecting a second occurrence of the first error, wherein disabling the trace control parameter in response to detecting the second occurrence of the first error includes printing one or more error messages corresponding to the first error interleaved with the one or more trace message instructions.

2. The computer-implemented method of claim 1 wherein saving the state of program execution at the first time includes saving one or more variable arrays corresponding to the state of program execution at the first time.

3. The computer-implemented method of claim 1 wherein executing the one or more trace message instructions includes, for each of the one or more trace message instructions, displaying one or more user messages to be used for purposes of debugging the computer program.

4. The computer-implemented method of claim 1 wherein initiating the traced program execution further includes disabling an error control parameter.

5. The computer-implemented method of claim 1, wherein printing comprises at least one of: displaying, outputting or spooling the interleaved one or more error messages and one or more trace message instructions.

6. A computer-readable medium having stored contents that,
when executed, cause a computing system to perform a method for providing error and trace data regarding execution of a computer program, the method comprising:
initiating, by the computing system, traced program execution of a computer program, wherein initiating the traced program execution includes disabling a trace control parameter;
saving, by the computing system, a state of program execution at a first time during the traced program execution;
subsequent to the first time and prior to an occurrence of a first error during the traced program execution, suppressing execution, by the computing system, of one or more trace message instructions based at least in part on a determination that the trace control parameter is disabled; and
in response to identifying that the first error has occurred:
enabling the trace control parameter;
restoring the state of program execution saved at the first time;
continuing the traced program execution, wherein continuing the traced program execution includes executing the one or more trace message instructions based at least in part on a determination that the trace control parameter is enabled; and
after continuing the traced program execution, disabling the trace control parameter in response to detecting a second occurrence of the first error, wherein disabling the trace control parameter in response to detecting the second occurrence of the first error includes printing one or more error messages corresponding to the first error interleaved with the one or more trace message instructions.

7. The computer-readable medium of claim 6 wherein saving the state of program execution at the first time includes saving one or more variable arrays corresponding to the state of program execution at the first time.

8. The computer-readable medium of claim 6 wherein executing the one or more trace message instructions includes, for each of the one or more trace message instructions, displaying one or more user messages to be used for purposes of debugging the computer program.

9. The computer-readable medium of claim 6 wherein initiating the traced program execution further includes disabling an error control parameter.

10. The computer-readable medium of claim 6, wherein printing comprises at least one of: displaying, outputting or spooling the interleaved one or more error messages and one or more trace message instructions.

11. A system, comprising:
one or more processors; and
at least one memory, the memory including instructions that, upon execution by at least one of the one or more processors, cause the system to perform a method for providing error and trace data regarding execution of a computer program, the method comprising:
initiating traced program execution of a computer program, wherein initiating the traced program execution includes disabling a trace control parameter;
saving a state of program execution at a first time during the traced program execution;
subsequent to the first time and prior to an occurrence of a first error during the traced program execution, suppressing execution of one or more trace message instructions based at least in part on a determination that the trace control parameter is disabled; and
in response to identifying that the first error has occurred:
enabling the trace control parameter;
restoring the state of program execution saved at the first time;
continuing the traced program execution, wherein continuing the traced program execution includes executing the one or more trace message instructions based at least in part on a determination that the trace control parameter is enabled; and
after continuing the traced program execution, disabling the trace control parameter in response to detecting a second occurrence of the first error, wherein disabling the trace control parameter in response to detecting the second occurrence of the first error includes printing one or more error messages corresponding to the first error interleaved with the one or more trace message instructions.

12. The system of claim 11 wherein executing the one or more trace message instructions includes, for each of the one or more trace message instructions, displaying one or more user messages to be used for purposes of debugging the computer program.

13. The system of claim 11 wherein initiating the traced program execution further includes disabling an error control parameter.

14. The system of claim 11, wherein printing comprises at least one of: displaying, outputting or spooling the interleaved one or more error messages and one or more trace message instructions.

* * * * *